(12) United States Patent
Alsafadi

(10) Patent No.: US 6,323,467 B1
(45) Date of Patent: Nov. 27, 2001

(54) METHOD AND APPARATUS FOR SELECTIVELY APPLYING HEAT TO AN OBJECT USING AN ADDRESSABLE ARRAY

(75) Inventor: Yasser Alsafadi, Yorktown Heights, NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/352,097

(22) Filed: Jul. 14, 1999

(51) Int. Cl.[7] ................................................ A47J 37/08
(52) U.S. Cl. .................. 219/480; 219/508; 219/521; 99/390
(58) Field of Search ................................ 219/480, 477, 219/508, 216, 486, 487, 492, 524, 521; 99/331, 389–390; 392/407, 411

(56) References Cited

U.S. PATENT DOCUMENTS

| | | | |
|---|---|---|---|
| 1,332,935 | * 3/1920 | Thomas et al. | 219/521 |
| 1,892,117 | 12/1932 | Perkins . | |
| 2,383,673 | * 8/1945 | Olving | 219/521 |
| 2,849,946 | * 9/1958 | Palmer | 219/521 |
| 2,910,929 | * 11/1959 | Sorenson | 219/521 |
| 3,641,921 | * 2/1972 | Toyooka et al. | 219/521 |
| 3,781,515 | * 12/1973 | Morris, Jr. et al. | 347/206 |
| 4,038,516 | * 7/1977 | Bergvall | 347/204 |
| 4,287,521 | * 9/1981 | Hakoyama | 346/35 |
| 4,524,386 | * 6/1985 | Scott | 348/164 |
| 4,656,927 | 4/1987 | Mosby et al. . | |
| 4,754,120 | * 6/1988 | Fujimura | 392/422 |
| 4,775,775 | * 10/1988 | Spigarelli et al. | 392/473 |
| 4,988,032 | * 1/1991 | Sakaguchi et al. | 228/102 |
| 5,156,637 | 10/1992 | Wai-Ching | 99/388 |
| 5,590,238 | * 12/1996 | Ericson | 392/412 |
| 5,653,158 | * 8/1997 | Balandier et al. | 99/327 |
| 5,659,657 | * 8/1997 | Overdorf | 392/422 |
| 5,819,637 | * 10/1998 | Botma et al. | 99/327 |
| 6,072,154 | * 6/2000 | Maynard | 219/209 |

FOREIGN PATENT DOCUMENTS

| | | |
|---|---|---|
| 2-10601 | * 1/1990 | (JP) . |
| 2-10602 | * 1/1990 | (JP) . |
| 2-279118 | 11/1990 | (JP) . |
| 3-258226 | 11/1991 | (JP) . |
| 11-87256 | * 3/1999 | (JP) . |

* cited by examiner

Primary Examiner—John A. Jeffery
(74) Attorney, Agent, or Firm—Gregory L. Thorne

(57) ABSTRACT

A heating apparatus having a heating grid array wherein individual elements of the heating grid array may by selected, thereby producing a heating/browning effect from the selected elements. Groups of the individual elements may be selected such that a desired heating/browning pattern is achieved. Elements of the grid array are selected for a duration of time such that a desired heating/browning pattern is produced. The heating apparatus contains an addressing circuit for addressing the grid array and a memory for storing heating/browning patterns. The heating device also contains a timing element for controlling the duration of time that the heating/browning pattern is applied. The memory contains duration data corresponding to all, or portions of the selected elements of the grid array. The duration data varies over the selected elements of the grid array so that different selected elements of the grid array are selected for different durations of time.

18 Claims, 2 Drawing Sheets

If (x == ON and y == ON)
turn heating element ON;
else
turn heating element OFF;

METHOD AND APPARATUS FOR SELECTIVELY APPLYING HEAT TO AN OBJECT USING AN ADDRESSABLE ARRAY

FIELD OF THE INVENTION

This invention generally relates to an apparatus for applying a heating/browning pattern to an object such as a food product. Specifically, the present invention pertains to utilizing a selectable heating element to apply a heating/browning pattern.

BACKGROUND OF THE INVENTION

Devices are known that have the ability to brown an object by applying heat through the use of a heating element such as a resistive metal strip. FIG. 1 shows a prior art toaster 100 that is utilized for toasting a piece of bread. As shown, the toaster 100 utilizes a first heating element 110, and a second heating element (not shown) that are in close proximity to each other. The heating elements typically are wrapped around or backed by a heat resistant object 120, such as a mica sheet. The heating elements are connected to a power line 130 through a switch (not shown). In operation, a piece of bread is placed between the heating elements and the switch is closed for a period of time (t) until the bread is browned to a desired level. The surface of the bread after browning typically has a uniform monotonic browning pattern. An oven utilizes a similar arrangement of one or two heating elements to uniformly brown or dry objects placed therein such as food objects, pottery objects, industrial objects, etc.

In the prior art, it is also known that placing a heat resistant object between the heating element and the object to be browned, such as a slice of bread, may produce a non-uniform pattern of browning. Such systems are described in U.S. Pat. No. 1,892,117 to Perkins, U.S. Pat. No. 4,656,927 to Mosby, and U.S. Pat. No. 5,156,637 to Wai-Ching. The problem with these prior art toasters is that differently shaped heat resistant objects are required for producing each different heating pattern in the bread.

Japanese Patent No. 3,258,226 to Masaru shows a system wherein a changeable mold is utilized as the resistant object. In this system, a computer is connected to the toaster. The mold is transformed into the shape of characters shown on the computer display. The mold is then brought into contact with the surface of the bread and the toaster is then switched on. The portion of the bread surface in contact with the mold is not toasted and the other portions of the bread surface are toasted. In this way, desired characters may be freely drawn or patterns formed on a slice of bread. This system is very complex in that a changeable mold is required to form the desired patterns on the bread surface. This has the effect of raising the price and complexity of the toaster.

Japanese Patent No. 2,279,118 to Toshihiko shows a different type of toaster wherein a heater nozzle is utilized for drawing a pattern onto the surface of the bread. In operation, the heater nozzle is moved over the surface of the bread while air is blown through the heater nozzle. The air is heated by the heater nozzle and blown at the surface of the bread thereby producing a browning of the surface of the bread. The heater nozzle is controlled by a stepper motor connected to a control circuit for the purposes of moving the heater nozzle over the surface of the bread thereby forming a desired pattern on the surface of the bread. This toaster is again overly complex and expensive to implement and has the added drawback of overly drying the bread as the pattern is drawn.

Accordingly, it is an object of the present invention to overcome the disadvantages of the prior art.

It is a further object of the present invention to provide an apparatus wherein a desired pattern may be readily browned into the surface of an object in a simple and inexpensive way.

It is still a further object of the present invention to provide an apparatus that may form a desired browning pattern without the need of utilizing changeable heat resistant shields.

A still yet further object of the present invention is to produce a heating apparatus wherein the shape/size of the heating pattern is controllable.

SUMMARY OF THE INVENTION

These and other objects of the present invention are achieved by a heating apparatus having a heating grid array wherein individual elements of the heating grid array may be selected, thereby producing a heating/browning effect from the selected elements. In operation, groups of the individual elements may be selected such that a desired heating/browning pattern is achieved. The heat is applied to an object by first bringing the object into close proximity with the grid array. Thereafter, elements of the grid array may be selected for a duration of time such that a desired heating/browning pattern is produced. The heating apparatus may contain an addressing circuit for addressing the grid array and a memory for storing heating/browning patterns. The heating device may also contain a timing element for controlling the duration of time that the heating/browning pattern is applied to the object. The memory may in this case contain duration data corresponding to all, or portions of the selected elements of the grid array. The duration data may vary over the selected elements of the grid array so that different selected elements are selected for different durations of time.

BRIEF DESCRIPTION OF THE DRAWINGS

The following are descriptions of embodiments of the present invention that when taken in conjunction with the following drawings will demonstrate the above noted features and advantages, as well as further ones. It should be expressly understood that the drawings are included for illustrative purposes and do not represent the scope of a present invention. The invention is best understood in conjunction with the accompanying drawings in which.

DETAILED DESCRIPTION OF THE INVENTION

Figure 1:
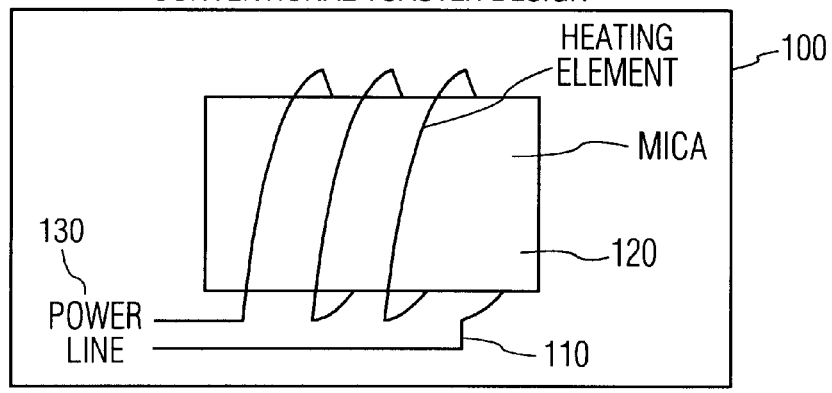
FIG. 1 shows a prior art toaster that is utilized for toasting a piece of bread.
Figure 2:
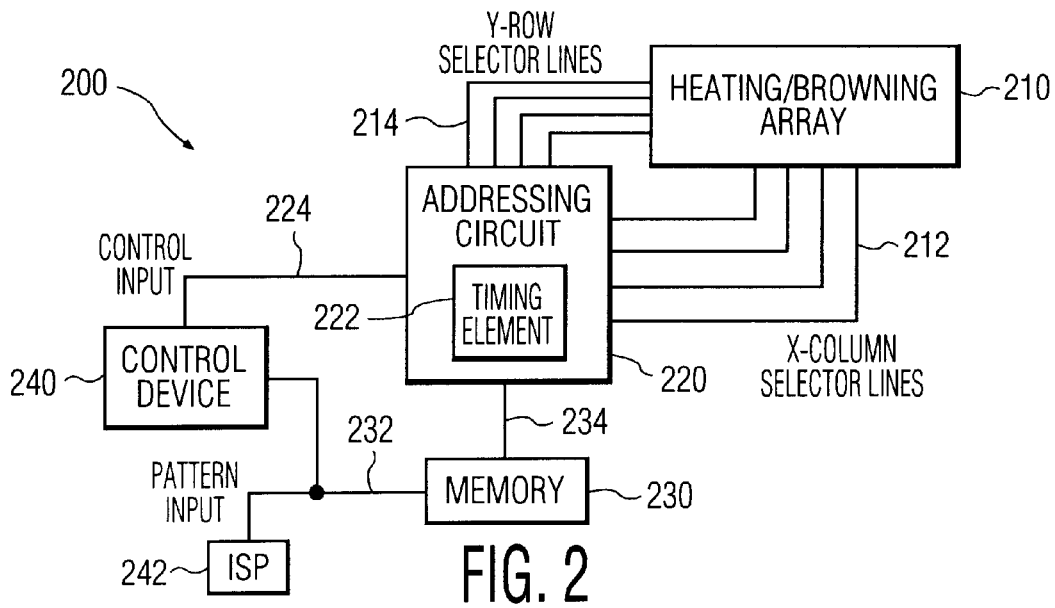
FIG. 2 depicts an illustrative heating/browning device in accordance with an embodiment of the present invention.

FIG. 2 depicts an illustrative heating/browning device 200 in accordance with an embodiment of the present invention.

The heating/browning device 200 has a heating/browning array 210, an addressing circuit 220, a memory 230, and a control device 240. The memory 230 is illustratively shown as a separate device from the addressing circuit 220. However, as a person of ordinary skill in the art would appreciate, the memory 230 could readily be integrated into the addressing circuit 220, the control device 240, or any other suitable component.

The heating/browning array 210 receives selector lines 212 (e.g., x-column selector lines) and selector lines 214 (e.g., y-row selector lines) from the addressing circuit 220. The selector lines are utilized for selecting (e.g., turning on) elements of the heating/browning array 210 as discussed in more detail herein below. The addressing circuit receives a control input signal 224 for selecting a desired heating/browning pattern from the control device 240. In one embodiment, the control device 240 may be a simple selector knob that selects from predefined heating/browning patterns. In an alternate embodiment, the control device 240 may be a hardware circuit, a programmable circuit, a software device, or some combination thereof, such as a personal computing device running an operating system and an application program.

The addressing circuit 220 also receives data from a memory 230 over a data input 234. The data corresponds to heating/browning array address and timing information for selecting corresponding elements of the heating/browning array 210 and thereby, producing the predefined heating/browning patterns. The timing information is utilized by a timing control element 222 for controlling the duration of turn on time for each element of the heating/browning array 210. For some heating/browning patterns, the timing information may be the same for each element of the heating/browning array 210. In this case, a uniform heating/browning pattern is produced by each of the on elements of the heating/browning array 210.

For embodiments wherein a uniform heating/browning pattern is desired over the selected elements of the heating/browning array 210, the data for the memory 230 may not contain timing information or there may be timing information that corresponds to all the selected elements. In these embodiments, the timing control element 222 may correspond to a mechanical device, a hardware timing device, a software timing device, etc. In the case of a mechanical device, the timing control element 222 may be a mechanical timer wherein the duration is selectable via a rotary or slidable selector knob. In other embodiments, the duration may be fixed for all heating/browning patterns.

For some heating/browning patterns, the timing information may be unique for portions of elements, or even individual elements of the heating/browning array 210. By varying the timing information for the elements of the heating/browning array 210, a varied heating/browning pattern may be produced across the heating/browning array 210. In this way, for example, when the heating/browning array 210 is utilized as a heating element for toaster, varying shades of browning patterns may be produced by varying the heating duration for the elements of the heating/browning array 210. In industrial applications, the heating/browning array 210 may be utilized for selectively drying portions of an applied film, such as an epoxy coating, a masking layer, a conductive layer, a dielectric layer, etc., without applying excessive heat to heat sensitive portions of an underlying integrated circuit (IC) chip.

In addition, the heating/browning array 210 may produce a power saving in applications wherein the heating/browning array 210 is larger than an object placed in close proximity for the purposes of applying the heating/browning pattern. In this case, only the portion of the heating/browning array 210 in proximity with the object need be selected (e.g., turned on), while portions of the heating/browning array 210 not in proximity with the object need not be selected. In this way, a general multipurpose heating device is operable for applying a heating/browning pattern to a multitude of differently sized and shaped objects, in an energy efficient manner.

In some embodiments, it may be desirable to have the heating/browning array 210 moved to a closer proximity to the object after the object is positioned. For instance, in the case of a toaster, in may be desirable to have the heating/browning array 210 moved closer to a food object, such as a slice of bread, after the bread is inserted into the toaster. In this way, the toaster may be adapted to readily accept various widths of bread slices. In addition, the heating/browning array 210 may produce a more distinctive pattern on the bread when it is in closer proximity to the bread. As a person of ordinary skill in the art would readily appreciate, any known system for repositioning an object may be readily adapted for also repositioning one or more of the heating/browning arrays. For instance, a pair of centering control plates that ensure that the object is properly centered between a pair of heating/browning arrays may also be utilized for repositioning the heating/browning arrays.

Figure 2A:
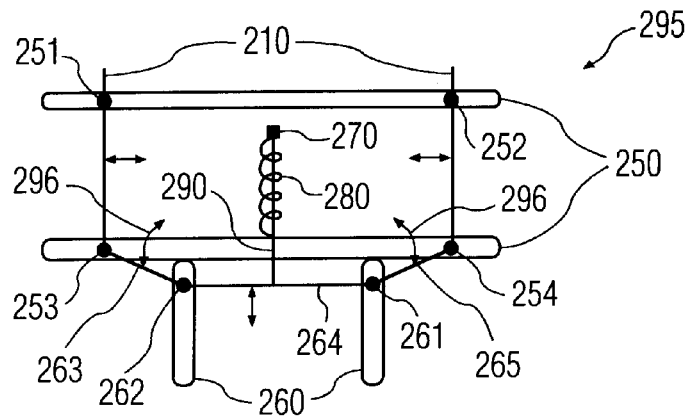
FIG. 2A shows mechanical components of an embodiment in accordance with the present invention wherein a pair of heating/browning arrays are vertically positioned.

FIG. 2A shows mechanical components of an embodiment wherein a pair of heating/browning arrays 210 are vertically positioned, such as for a toaster 295. The pair of heating/browning arrays 210 respectively have pins 251, 253, and 252, 254 for fixing the pair of heating/browning arrays 210 in a horizontal plane within horizontal tracks 250 and enabling repositioning within the horizontal plane as described herein below. The pins 253, 254 also act to rotatably affix the pair of heating/browning arrays 210 to respective connecting members 263, 265. The connecting members 263, 265 are in turn rotatably attached to a horizontal member 264 via pins 262, 261. The pins 262, 261 are positioned within vertical tracks 260 and thereby, affix the horizontal member 264 in a horizontal position, yet allow motion in a vertical plane within the vertical tracks 260. The horizontal member 264 is fixedly attached to a lower end of a shaft 290. An upper end of the shaft 290 is connected to a knob 270 and an upper end of a spring member 280. A lower end of the spring member 280 is fixedly attached to one of the horizontal tracks 250. In FIG. 2A, the toaster 295 is shown in an initial position.

In this embodiment, an object may be positioned between the pair of heating/browning arrays 210. Thereafter, the knob 270 may be repositioned in a downward direction, thereby compressing the spring member 280 between the knob 270 and the horizontal track 250. The shaft 290 in turn moves the horizontal member 264 in a downward position. Since the pins 262, 261 are fixed by vertical tracks 260, and the pins 253, 254 are fixed by the lower horizontal track 250, the downward movement of the horizontal member 264 rotates the members 263, 265 up and inward as indicated by repositioning arrows 296. The rotating of the members 263 and 265 shifts the pair of heating/browning arrays inwards. At this time, the pair of heating/browning arrays are selectably turned on as described in more detail herein. At the end of a given duration, the pair of heating/browning arrays 210 are turned off and the spring 280 acts to return the above components of the toaster 295 to the initial position.

Figure 3:
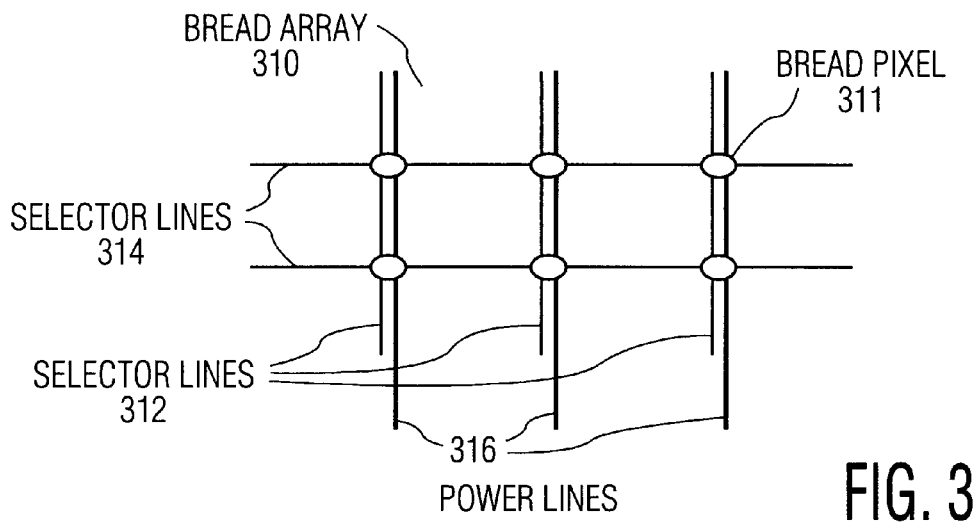
FIG. 3 shows a detailed view of a heating/browning array configured as a bread array.

FIG. 3 shows a detailed view of a heating/browning array configured as a bread array 310. As shown, the bread array 310 has selector lines 312 and selector lines 314 for selecting bread pixels 311 of the bread array 310. In one embodiment, a particular combination of selector lines is operable for selecting a corresponding one of the bread pixels 311. In this way, any combination of on and off bread pixels may be selected for producing a desired browning pattern on the surface of the slice of bread. In this embodiment, the addressing circuit 220 shown in FIG. 2 is operable to individually address any combination of on bread pixels for producing a desired heating/browning pattern.

In an alternate embodiment, the selector lines 312 may correspond to X-column selector lines and the selector lines 314 may correspond to Y-row selector lines. In this embodiment, the selector lines are operable for producing one or more rectangular heating/browning patterns. In this embodiment, each one of the X-column selector lines and the Y-row selector lines address a corresponding column or row of the heating/browning array. In operation, any pixel that is positioned on a selected "on" X-column and Y-row will be "on". Any pixel that is positioned on an X-column and/or Y-row that is "off", will also be "off".

Figure 4:
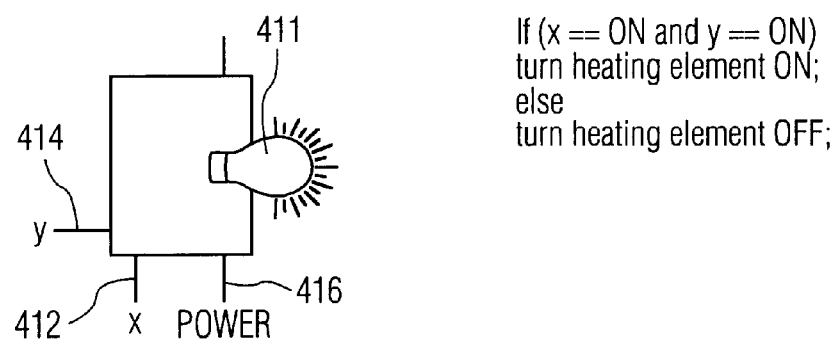
FIG. 4 is a block diagram illustrating the operation of a particular pixel of a heating/browning array in accordance with an embodiment of the present invention.

FIG. 4 is a block diagram illustrating the operation of a particular pixel 411 of a heating/browning array. As shown, the pixel 411 receives a power input 416, an X-selector line 412, and a Y-selector line 414. In operation, if the X-selector line 412 and the Y-selector line 414 are on, then the pixel 411 is on. If one or both of the X-selector line 412 and the Y-selector line 414 are off, the pixel 411 is off.

Figure 5:
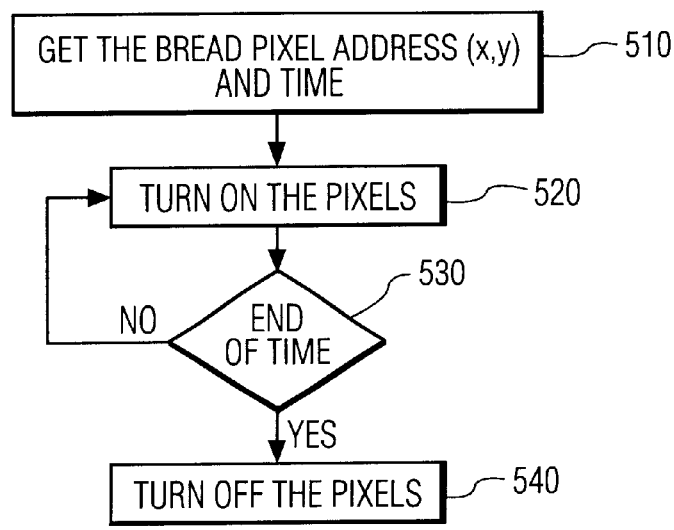
FIG. 5 is a flow diagram illustrating the operation of an embodiment of a heating/browning device in accordance with the present invention, such as for example shown in FIG. 2.

FIG. 5 is a flow diagram illustrating the operation of an embodiment of the heating/browning device 200 shown in FIG. 2. In step 510, the control device 240 controls the addressing circuit 220 through control input 224 to retrieve picture content (e.g., a pattern) from the memory 230. The picture content corresponds to a particular combination and "on" duration of pixel elements and may be expressed as:

{x,y,t}|($x_{ij}$,$y_{ij}$): Picture Content, wherein x=one of on or off for each pixel element $x_{ij}$,$y_{ij}$;

y=one of on or off for each pixel element $x_{ij}$,$y_{ij}$; and t=heating duration for each pixel element $x_{ij}$,$y_{ij}$.

It should be noted that the "on" duration for an element that is not desirably selected for a given pattern, may be zero. In this way, each element of the heating/browning array may be configured for each pattern.

In step 520, the addressing circuit 220 addresses the heating/browning array 210 to turn on selected pixel elements corresponding to the selected picture content and starts the timing control element 222 for timing the on duration of the selected pixel elements. In step 530, the timing control element 222 determines if the on duration of each of the selected pixel elements, a portion of the selected pixel elements, or all of the selected pixel elements has expired. For the selected pixels wherein the on duration has expired, in step 540 the pixels are turned off. For the selected pixels wherein the on duration has not yet expired, the pixels are maintained on until the on duration has expired.

As shown in FIG. 2, the memory 230 may receive patterns, such as picture patterns, from a pattern input 232. In one embodiment, the pattern input 232 may correspond to a power line wherein pattern data is embedded within a carrier wave. In another embodiment, the pattern input 232 may be connected to an internet service provider (ISP) 242 and patterns may be downloaded from the Internet or the ISP 242 directly. In other embodiments the pattern input 232 may receive a signal during the vertical blanking interval of a television broadcast signal. In yet another embodiment, the control device 240 may correspond to a personal computing device (PC) and the picture patterns may be received from the PC and/or may be created on the PC utilizing a general or specially configured pattern creation program. In this embodiment or yet still a further embodiment, a program may be utilized to capture printer output signals from the control device 240 via the pattern input 232 and interpret the printer output signals as picture patterns. The pattern input 232 may be connected to a flash memory slot or an other connector for receiving additional memory devices. In this way, a user may acquire (e.g., buy, rent, etc.) additional images for use with device of the present invention.

Finally, the above-discussion is intended to be merely illustrative of the invention. Numerous alternative embodiments may be devised by those having ordinary skill in the art without departing from the spirit and scope of the following claims.

The claimed invention is:

1. A method of selectively applying heat to an object comprising:

receiving a heating pattern from an Internet Service Provider (ISP);

applying said heating pattern to the object utilizing an addressable heating array, wherein said heating pattern selectively turns on a portion of said addressable heating array.

2. The method of claim 1, wherein said heating pattern includes duration data, said method comprising applying said heating pattern in accordance with said duration data.

3. The method of claim 2, wherein said duration data varies over said portion of said heating array such that different parts of said portion of said heating array are on for different durations of time.

4. The method of claim 1, wherein said ISP comprises a plurality of heating patterns, said method comprising selecting a particular one of said plurality of heating patterns for receiving by said addressing device.

5. The method of claim 1, further comprising repositioning said addressable heating array closer to said object prior to applying said heating pattern.

6. A heating device for applying heat to an object, said device comprising:

an addressing device;

an addressable heating array configured to receive an output from said addressing device and to selectively turn on a portion of said, addressable heating array in accordance with said output; and a pattern input, wherein said pattern input is configured to receive pattern data from said pattern input, and to produce said output in accordance with said pattern data, and wherein said pattern input is connected to an internet service provider (ISP).

7. The heating device of claim 6, wherein said output comprises duration data and said addressable heating array is configured to selectively turn on said portion of said addressable heating array in accordance with said duration data.

8. The heating device of claim 7, comprising a timing element, wherein said timing element is configured to turn on said portion of said addressable heating array at a start time and to turn off said portion of said addressable heating array at the end of said duration.

9. The heating device of claim 7, comprising a timing element, wherein said duration data varies over said portion of said addressable heating array, and wherein said timing element is configured to turn on and off said portion of said addressable heating array in accordance with said varied duration data.

10. The heating device of claim 6, comprising a memory operably coupled to said pattern input, wherein said addressing device is configured to receive said pattern data from said memory.

11. The heating device of claim 10, comprising a control device, wherein said memory is configured to contain a plurality of pattern data and said control device is configured to select one of said plurality of pattern data for receipt by said addressing device.

12. The heating device of claim 6, wherein said addressing device is configured to be connected to a computer and said addressing device is configured to receive pattern data from the computer and to produce said output in accordance with said pattern data.

13. The heating device of claim 12, wherein said addressing device is configured to be connected to a printer output of the computer and to convert a signal received from the printer output into said output from said addressing device.

14. A heating device for applying heat to an object, said device comprising:

an addressing device configured to be connected to a printer output of a computer; and an addressable heating array configured to receive an output from said addressing device and to selectively turn on a portion of said addressable heating array in accordance with said output, wherein said addressing device is configured to convert a signal received from the printer output into said output from said addressing device.

15. The heating device of claim 14, wherein said output comprises duration data and said addressable heating array is configured to selectively turn on said portion of said addressable heating array in accordance with said duration data.

16. The heating device of claim 15, comprising a timing element, wherein said timing element is configured to turn on said portion of said addressable heating array at a start time and to turn off said portion of said addressable heating array at the end of said duration.

17. The heating device of claim 15, wherein said duration data varies over said portion of said addressable heating array, and wherein said portion of said addressable heating array is configured to turn on and off in accordance with said varied duration data.

18. The heating device of claim 15, comprising a timing element, wherein said duration data varies over said portion of said addressable heating array, and wherein said timing element is configured to turn on and off said portion of said addressable heating array in accordance with said varied duration data.

* * * * *